US008094795B2

(12) United States Patent
Karlsson

(10) Patent No.: US 8,094,795 B2
(45) Date of Patent: Jan. 10, 2012

(54) METHOD FOR HANDLING ACCOUNTS IN A NETWORK

(75) Inventor: Stefan Karlsson, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1428 days.

(21) Appl. No.: 11/609,616

(22) Filed: Dec. 12, 2006

(65) Prior Publication Data

US 2007/0149849 A1 Jun. 28, 2007

(30) Foreign Application Priority Data

Dec. 23, 2005 (EP) .................................... 05112918

(51) Int. Cl.
*H04M 15/00* (2006.01)

(52) U.S. Cl. ............ 379/114.2; 379/114.26; 379/114.01

(58) Field of Classification Search ............... 379/114.2, 379/114.26, 114.01, 114.07, 91.01–91.02, 379/115.01–115.03, 133–134, 121.01, 121.04
See application file for complete search history.

(56) References Cited

U.S. PATENT DOCUMENTS 6,009,156 A * 12/1999 Cross ...................... 379/114.26
7,715,537 B2 * 5/2010 Ress et al. ................ 379/114.01

* cited by examiner

*Primary Examiner* — Melur Ramakrishnaiah

(57) ABSTRACT

A method for operating a computer system to handle switch over between several accounts at account selection in a real time charging system, wherein at a charging rating of a session, a first account is selected from a set of accounts, to be used and rated with its charging interval; the cost of a first charging interval is calculated for the first account; it is determined if the cost for the first charging interval is covered by the balance of the first account; if the cost for the first charging interval is not covered, a second account is selected to be used from the set of accounts; the cost for a next charging interval is determined; it is determined if the cost for the next charging interval minus the residue money left on the first account is covered by the balance of the second account; and if so, continue with the next charging interval, wherein the residue money left on the first account is used before the selected second account is used.

12 Claims, 6 Drawing Sheets

METHOD FOR HANDLING ACCOUNTS IN A NETWORK

This application claims the benefit of EP patent application number 05112918-7 filed on Dec. 23, 2005, the disclosure of which is fully incorporated herein by reference.

TECHNICAL FIELD OF THE INVENTION

The present invention relates to a method for handling switch over between several accounts at account selection in a real time charging system.

DESCRIPTION OF RELATED ART

Charging for usage of services in a communications network, such as mobile telephone communications networks as GSM, public switched telecommunications networks (PSTN), ISDN, Internet etc. is achieved by means of a payment mechanism or service. Both postpaid and prepaid services are used. In a pre-paid systems it is common practice to load an account with money and then deduct the account balance due to subscriber usage. For an ongoing session, such as a phone call, data transmission, SMS transmission, MMS transmission, streaming etc., the account balance is decreased step by step. Various services are charged based on one or more charging rates which depends on destination, time of day, subscriber type etc.

When defining a charging rate also a smallest unit to be charged is defined. The unit is either assigned to the rate (cost) or by implementation in the system as a rounding rule. One example is a rate of €0.1/minute with a 30 second charging interval. Either each started interval (30 seconds in the above example) is charged or all completed intervals (30 second in the example above) are charged. Type of unit can be monetary terms (e.g. €) or time (e.g. seconds) but also for example downlink volume, total volume and events. Typically, the intervals may change for different rates. Rounding rules could be either that usage is rounded to a time unit such as seconds by use of asymmetric arithmetic rounding or banker's rounding. This interval is called the charging interval. An important purpose of the charging interval is to prevent all users from reporting usage at the same time and thereby overloading the signalling networks. The reports are spread over time relative to their start time and the number of used charging intervals since the start time.

A dedicated account is an account connected to a dedicated use. The use could be general, such as voice or more specific such as SMS at weekends. A dedicated account could be used to implement promotions or contractual rules such as an allowance of 20 free SMS a month, €10 of voice calls per month etc.

When one promotion is used up, i.e. the dedicated account, account or bucket is emptied, another one is checked for use, i.e. selected. This mechanism also works generically, i.e. if one resource is emptied another applicable entity is to be used.

Another example is main accounts for a company which is used when the individual employee's quota is used up.

The problem lays in that when a dedicated account, account or bucket does not contain enough money to cover a complete charging interval, the money on that account might never be used even if other accounts/buckets are selected. When an account is found to be applicable to the charged event and the reservation, it might be sent to the rating process that discovers that the funds did not fully cover a charged interval, i.e. that an available rest could not be used. When a new account/bucket is selected to increase the reservation, it might be the case that the new account/bucket requires a new rate and a new charging interval. The rest that was left on the account(s)/bucket(s) may never be used, but might still be a part of the lifecycle handling of the subscription (e.g. minimum amount needed on account to be provided a service).

As an example, a simplified rating plan could be that a rate 1 is used for a dedicated account/bucket 1 and a rate 2 is used for a dedicated account/bucket 2. Rate 1=€0.3/minute with a charging interval=20 seconds. Rate 2=€0.1/minute with a charging interval=10 seconds.

The dedicated account/bucket 1 contains €0.65 and the dedicated account/bucket 2 contains €1. In this example the dedicated account/bucket 1 is selected first and then the dedicated account/bucket 2. The reason for this could be that accounts/buckets are the value of two promotions for voice calls where the account/bucket 1 is the oldest promotion of the two.

The funds on the dedicated account/bucket 1 will correspond to 6 charging intervals in the rate 1. €0.3/minute=→€0.1/interval, which gives round up

[€0.65/€0.1]=6 charging intervals. Thus, €0.05 (€0.65-€0.1*6) is left on the account when the dedicated account/bucket 2 is started to be used.

When the reservation is started the first €0.6 is used from the bucket 1 for the first 6 charging intervals at 20 seconds (i.e. first 120 seconds). The rest, i.e. the €0.05 could not be used. The bucket 2 is then used until the service is stopped by the user after, say, 5 charging intervals at 10 seconds (50 seconds) leaving €0.5 in bucket 2. The funds from bucket 1 could only be used if it is selected by a rate that uses a charging interval corresponding to a cost that is equal to or less than €0.05.

Then, in other following cases, the bucket 1 will be selected, but the rating will notice that the money is not covering an interval, and the rating is forced to select a new bucket.

Since it is only the rating process that will know whether the amount is enough or not when it finds the rate, the increased amount of selections will cause an inefficient use of the system resources. This is a problem of particular relevance in charging architectures where accounts, reservation process and rating are distributed on separate system nodes as in 3GPP TS 32.296 where each selection gives rise to excess signalling between the nodes. It is also an annoyance to the user that its money could not be used. The problem will increase with the amount of buckets/dedicated accounts or sub-accounts, i.e. mainly due to the number of promotions and the length of time were they are valid. A full scale charging system may handle several millions of subscribers and accounts. System references/calls to accounts with not enough balance for the charging interval will be considerable with respect to consumed system resources.

SUMMARY

According to some embodiments of the invention it is provided a method for operating a computer system (100) to handle switch over between several accounts at account selection in a real time charging system, comprising:

at a charging rating of a session or event, selecting a first account from a set of accounts, to be used and rated with its charging interval;

calculating the cost of a first charging interval for the first account;

determining if the cost for the first charging interval is covered by the balance of the first account (202*a*; 302*a*);

if the cost for the first charging interval is not covered, selecting a second account to be used from the set of accounts;

determining if the cost for a current charging interval minus the residue units left on the first account is covered by the balance of at least the second account; and if so, continuing with the current charging interval, and using the residue units left on the first account before units of the selected second account is used.

According to some embodiments of the invention it is provided a computer program product directly loadable into the memory of a computer system having digital computer capabilities, comprising software code portions for performing the steps of the method when said product is run by said computer system.

According to some embodiments of the invention it is provided a computer apparatus or system for working the method.

Further embodiments are defined by the appended dependent claims.

BRIEF DESCRIPTION OF THE DRAWINGS

In order to explain the invention in more detail and the advantages and features of the invention, preferred embodiments will be described in detail below, reference being made to the accompanying drawings, in which.

DETAILED DESCRIPTION OF PREFERRED EMBODIMENTS

Figure 1A:
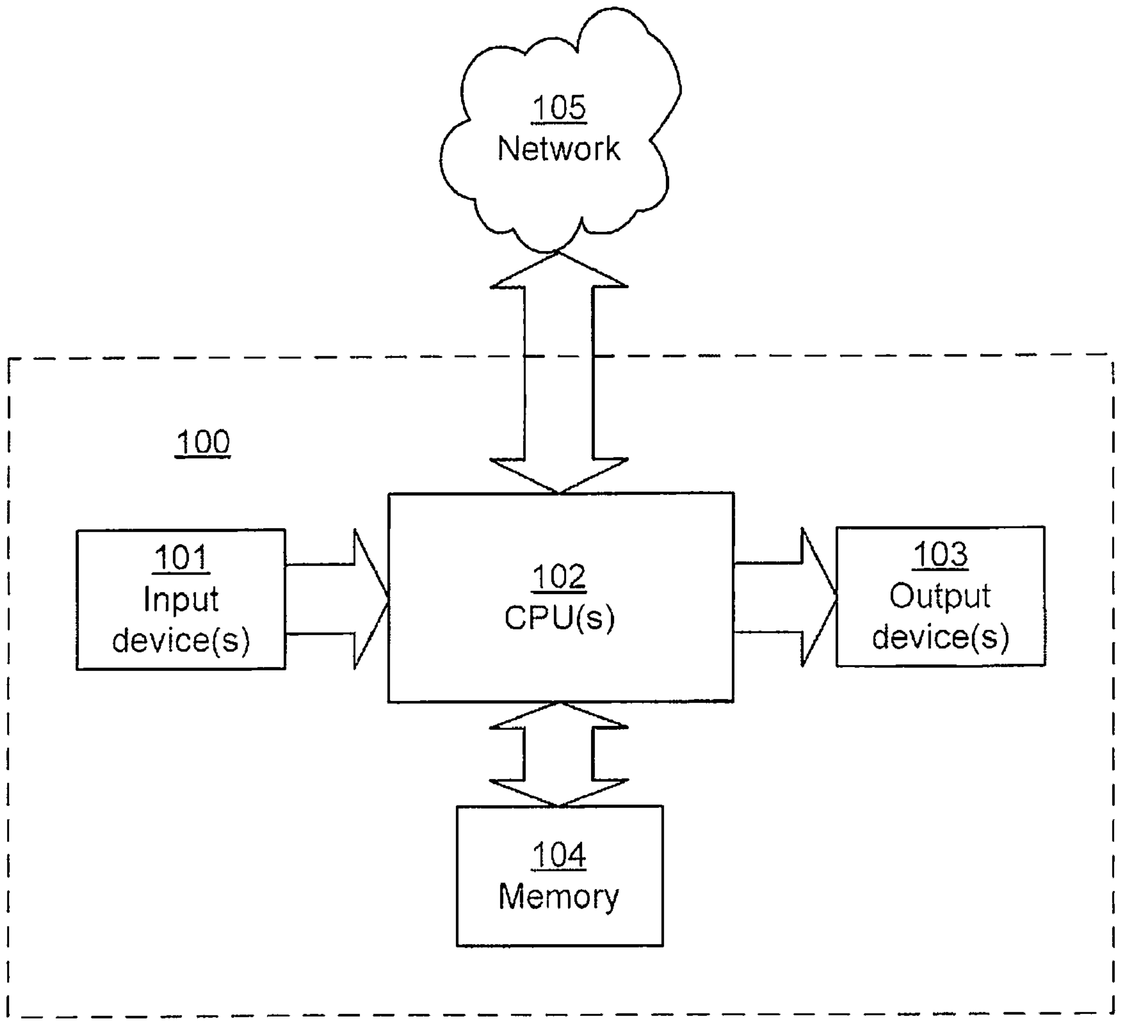
FIG. 1 shows an embodiment of a computer system for handling switch over between several accounts at account selection according to the invention.
FIG. 1B shows an embodiment of a schematic process diagram.

FIG. 1A shows an embodiment of a computer apparatus or system 100 for handling switch over between several accounts at account selection according to the invention for a real time charging system in order to emptying accounts. The charging system can be used in a communications network for charging of service usage.

The computer system 100 is an electronic device capable of interpreting and executing programmed commands for input, output, computation, and logic operations, and the computer system is intended to be used in a telecommunications network. The computer system 100 comprises, but is not limited to, one or more input devices 101, central processing units 102, output devices 103, and one or more internal or external storage devices 104, all of which are operatively interconnected. The computer system 100 is adapted for communicating with a network 105.

When defining a charging rate in a charging system, also a smallest unit to be charged is defined. The unit is either assigned to the rate (cost) or by implementation in the system as a rounding rule. One example is a rate of the number of €/s (unit time) with a charging interval of a number of seconds. A charging interval may also be measured in volume (e.g. number of bytes) or number of events. Hence type of unit can be monetary terms (e.g. €) or time (e.g. seconds) but also for example downlink volume, uplink volume, total volume and events.

According to a first embodiment of the invention the computer system 100 may be configured to work a first embodiment of the method of the invention, wherein a new rate with its charging interval starts when the money from a current account does not cover the complete next charging interval for a current rate. This means that the next interval is allowed to "underflow" and take money from the previous account in order to empty that account.

Figure 1B:
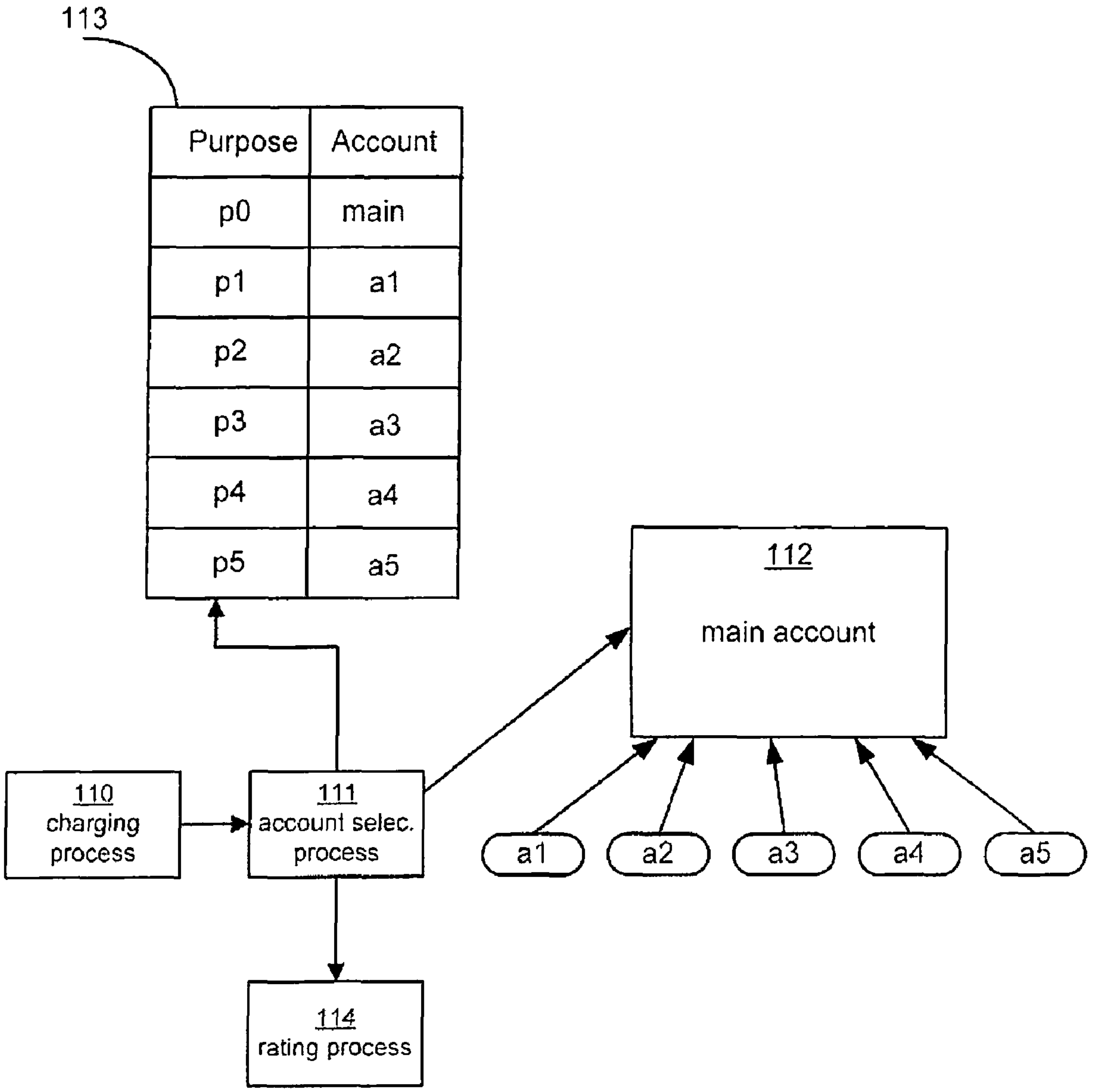

An embodiment of a schematic process diagram for implementing the method according to the invention is shown in FIG. 1B.

A charging process 110 contacts an account selection function or process 111 for selecting any of a main account 112 or its dedicated accounts a1-a5. This process or function uses a selection table/tree 113 that defines under which circumstances the main account and the dedicated accounts a1-a5 in this embodiment are to be used. The circumstances are illustrated by purposes p0-p5 in the table 113.

A rating process 114 may then use the main account and the dedicated account identity a1-a5 to differentiate the price.

Figure 2A:
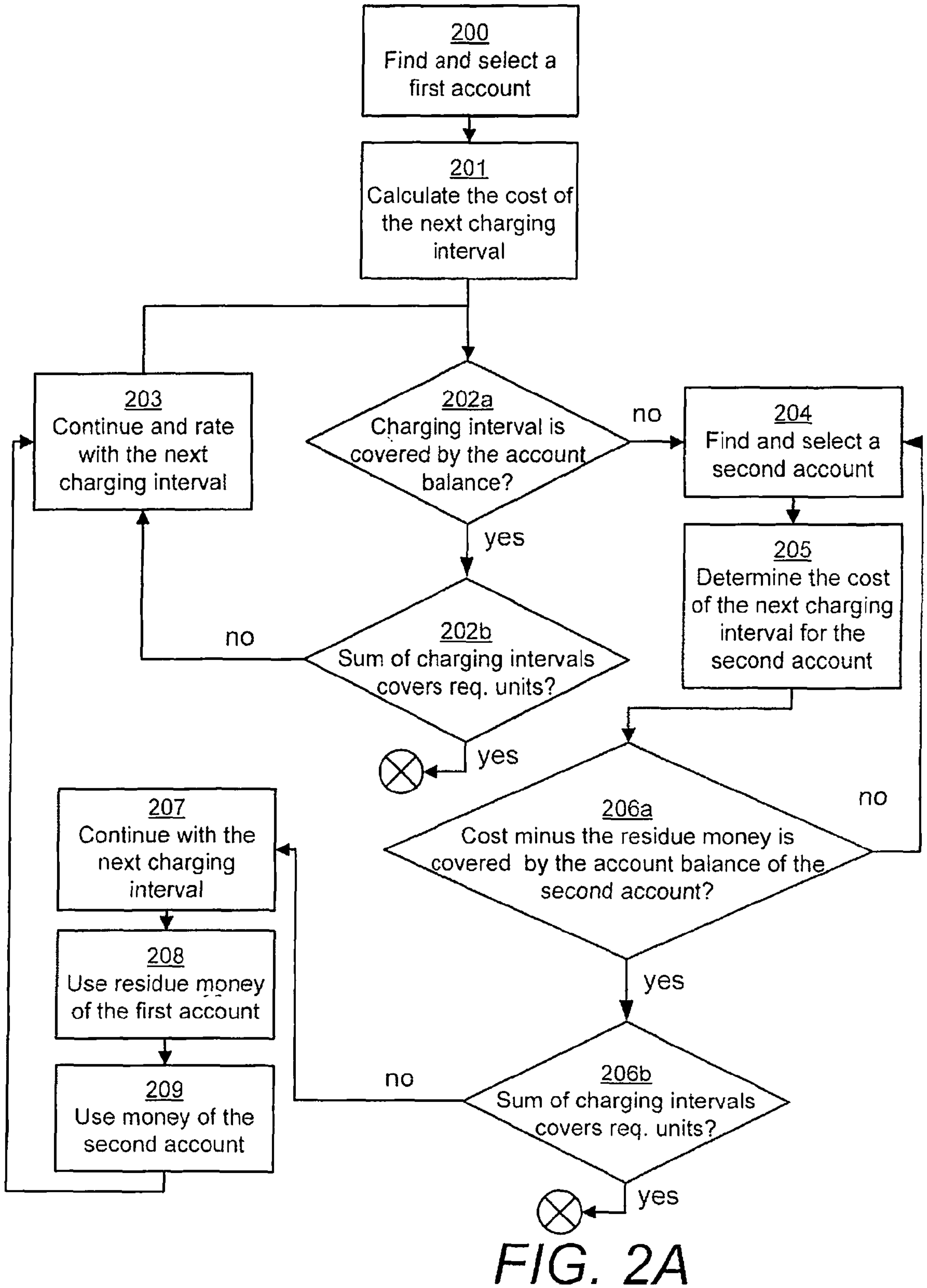
FIG. 2A is a flowchart of a first embodiment of the method according to the present invention.

With reference to the flow chart in FIG. 2A, at a charging rating of a session or event (e.g. deduct or reservation), a first account to be used and rated with its charging interval is to be found and selected from a set of accounts in step 200. The cost of the next charging interval is determinated or calculated in step 201. It is determined in step 202*a* if the cost for the next charging interval is covered by the balance of the first account. If so, it is determined in step 202*b* if the sum of charging intervals covers the requested units for the session. If the sum covers the units, the session or event may be completed without further account selection. However, if the test in step 202*b* is negative, the method continues with the next charging interval in step 203. Steps 202*a*, 202*b*, and 203 are repeated until the sum of charging intervals covers the requested units.

However, if it is determined in step 202 that the cost for the next charging interval is not covered, a second account in an account structure/selection order to be used and rated with its charging interval is to be found and selected from a set of accounts in step 204. The cost of a current charging interval, i.e the next charging interval for the second account in this embodiment, is determined or calculated in step 205. It is determined in step 206*a* if the cost for the next charging interval of the second account minus the residue money left from the first account is covered by the balance of the second account. If so, it is determined in step 206*b* if the sum of charging intervals covers the requested units for the session. If the sum covers the units, the session or event may be completed without further account selection. However, if the test in step 206*b* is negative, continue with the next charging interval in step 207. The residue money left from the first account is used in step 208 before the selected second account is used in step 209. The method may then continue with the next charging interval, i.e the cost for the second charging interval, in step 203, i.e the charging interval for the second account. The method may proceed with step 202*a* and 202*b* until the sum of charging intervals covers the requested units. If it is determined that the charging interval is not covered by the account balance, i.e. the second account, a "new" second account is to be found in step 204 and so on.

It is to be noted that the step 206*a*, of determining whether the cost for the next charging interval minus the residue money left from the first account is covered by the balance of the second account, is equivalent with a step of determining whether the cost for the next charging interval is covered by the balance of the second account when the residue units or money left is zero.

However, if it is determined in step 206*a* that the cost for the next charging interval is not covered, a "new" or third account to be used and rated with its charging interval is to be found and selected from the set of accounts. This means that money will first be deducted from the first, then a second, then a third account etc. to cover the cost for a charging interval.

Although, it is not explicitly shown in FIG. 2A, the process may terminate if the session is ended or if there is no account to select or any units or money left.

Figure 2B:
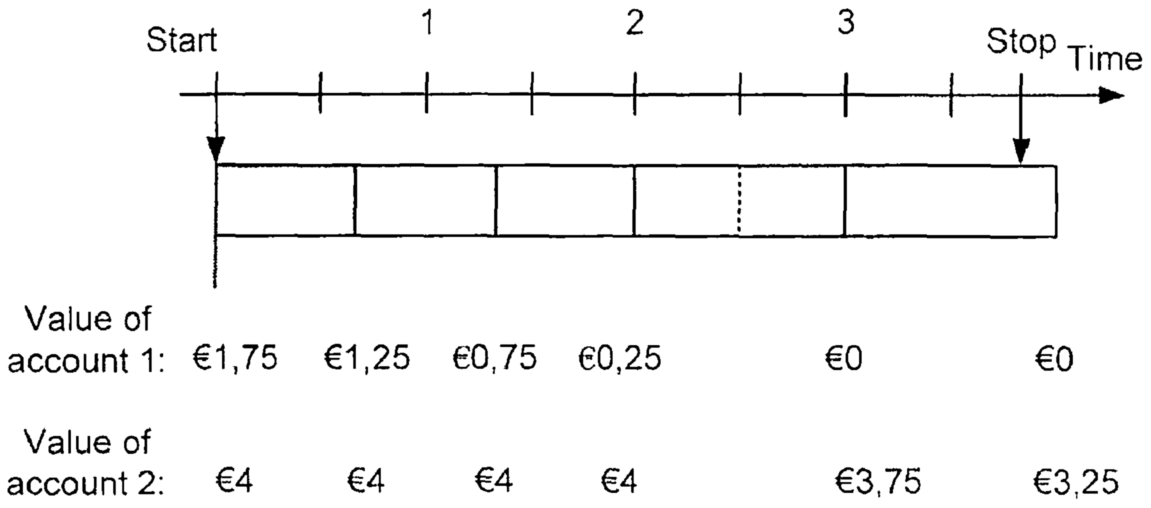
FIG. 2B illustrates an example embodiment of the first embodiment of the method of the invention.

An example embodiment of the present invention may be illustrated by FIG. 2B. The time is drawn from left to right according to an arrow (Time) where each 30 seconds are marked. There is a start (Start) and a stop (Stop) of the charged activity, i.e. the user activity and not the charging, highlighted with vertical lines.

There are two accounts, a first account 1 and a second account 2, that are valid for this example. Account 1 is prioritized to be used before account 2 in this particular situation.

The rate applicable to account 1 is €0.75/minute and account 2 is €0.5/minute. The rate for account 1 has a charging interval of 40 seconds and the rate plan for account 2 has an interval of one minute (60 seconds). This means that an interval with account 1's rate costs €0.5 and an interval with account 2's rate costs €0.5.

The filled boxes are filled with money from the first account 1 and the white boxes from the second account 2.

After the last completely filled charging interval with the rate used for the first account 1 is over, €0.25 still remains. Compared to a prior art method, the method according to the present invention would not leave the €0.25 unused in the first account 1 and switch to the second account 2, when the last fully covered interval is used. The remaining €0.25 may instead be used to fill the next interval that belongs to the rate used for the second account 2. The invention allows account 1 to exceed its limitations and its money to be used as if it was from the next account. The rating engine and system will treat the money as if they were fetched from the first account 1 although they are used for the rate belonging to the second account 2 or they can be treated as belonging to account 2. This may for example be of importance when calculating total usage cost and awarding bonuses, because for example usage of account 1 may account for bonus while account 2 is not.

According to one example of the invention the rates (cost and charging intervals) are connected to the account being used, e.g. when the first account 1 is used to store promotion money and the second account 2 is the ordinary account, or the first account 1 is pre-charged money and the second account 2 is credits. This is only an example and the invention is not limited to that. More often the account does not affect the rate and only represents an amount of money for a dedicated purpose or a dedicated user. In any case this behaviour will be more straight forward if it is the same rate for all accounts and all money has the same restrictions, because a partly filled interval is only to fill with money from the next account. The above mentioned example shows that the residue money from the first account 1 is treated in the same way as if they were fetched from the second account 2 when the second account 2 rating was used.

A bonus is account sensitive. If the first account 1 is a promotion and the second account 2 is the ordinary account in the example, the bonus would normally only apply to the funds fetched from the second account 2. This is done to prevent awarding bonus on bonus.

This method could be described by having started charging intervals to be finalized using money from the next applicable account if the money from the first account is not enough. This means that the first interval is allowed to "overflow" and take money from the next account in order to complete its started interval.

This second embodiment is described with reference to the flow chart in FIG. 3A.

At a charging rating (e.g. deduct or reservation) for a requested service a first account to use and to rate with its charging interval is to be found in step 300. The cost of the next charging interval is calculated in step 301, and it is determined in step 302*a* if the cost for the next charging interval is covered by the balance of the first account. If so, it is determined in step 302*b* if the sum of charging intervals covers the requested units for the session. If so, the session or event may be completed without further account selection. However, if the test in step 302*b* is negative, the method continues with the next charging interval in step 310. Steps 302*a*, 302*b*, and 310 may be repeated until the sum of charging intervals covers the requested units.

However, if the cost is not covered a second account is to be found in step 303 to be used and to use that second account's money to complete the started interval. It may be determined in step 304*a* if the cost for the next charging interval for the first account minus the balance of the first account is covered by the balance of the second account. If so, it is determined in step 304*b* if the sum of charging intervals covers the requested units for the session. If the sum covers the units, the session or event may be completed without further account selection. However, if the test in step 304*b* is negative, the second account may be selected and the method continues and rates with a current charging interval, i.e. the charging interval of the first account in this embodiment, in step 305. If possible, the charging interval may be completed by using residue money of the first account in step 306 and money from the second in step 307.

However, if it is determined in step 304*a* that the cost for the next charging interval is not covered, a further account in an account structure/selection order to be used and to be rated with its charging interval may be found and selected from the set of accounts [main, a1-a5] in step 308. The balance of the further account may be added to the balance of the second account in step 309. Steps 304*a*, 308, and 309 may be repeated until the cost for the first charging interval is completed. Then, the method may proceed to step 305 and so on.

When the first charging interval is completed the cost for the next charging interval may be determined. The next charging interval may be the charging interval of the second account or one of the one or more used further accounts, based on the account structure/selection order to be used.

Figure 3A:
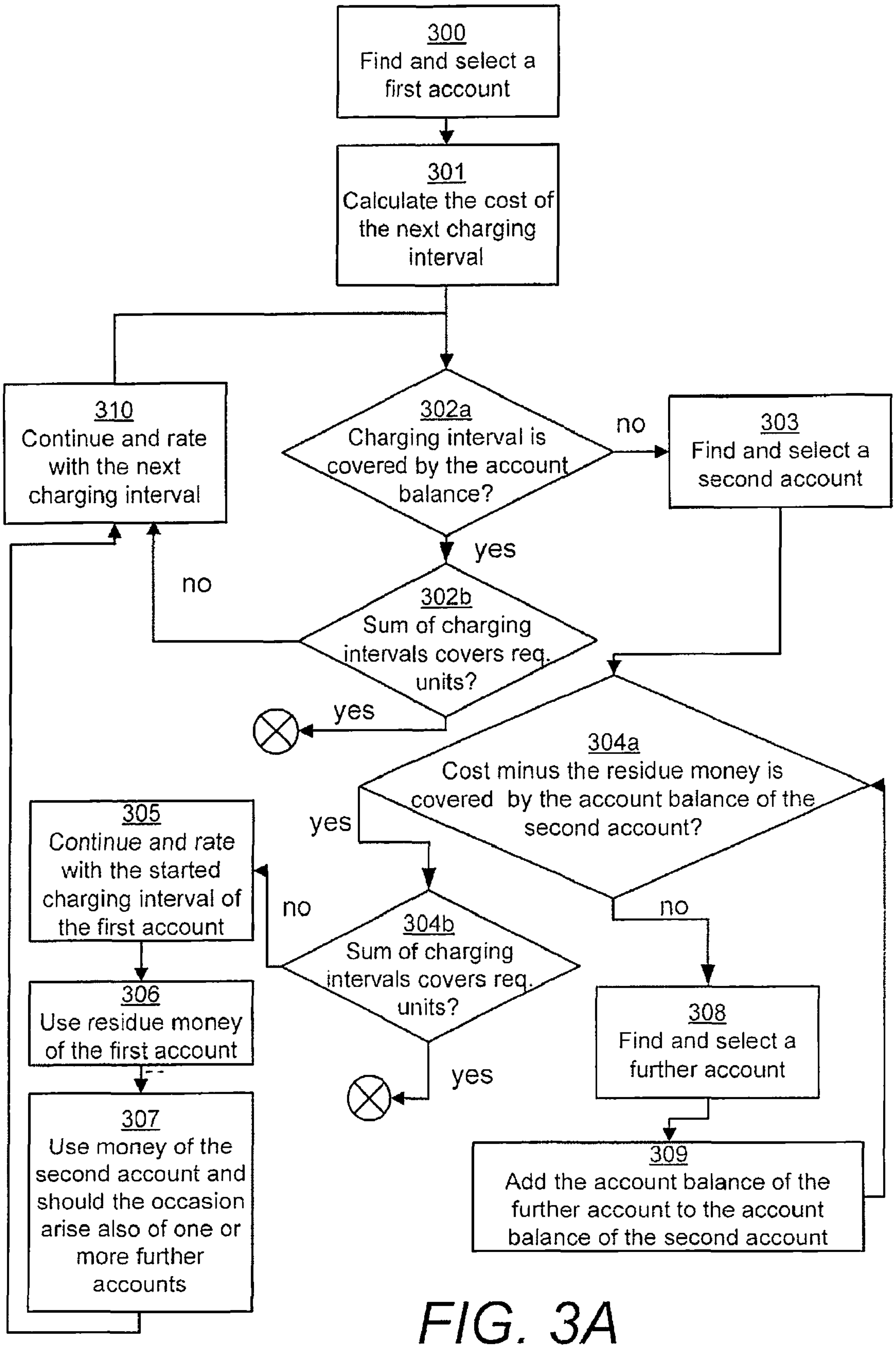
FIG. 3A is a flowchart of a second embodiment of the method according to the present invention.

Although, it is not explicitly shown in FIG. 3A, the process may also terminate if the session is terminated, or if there is no account to select or any money left.

Figure 3B:
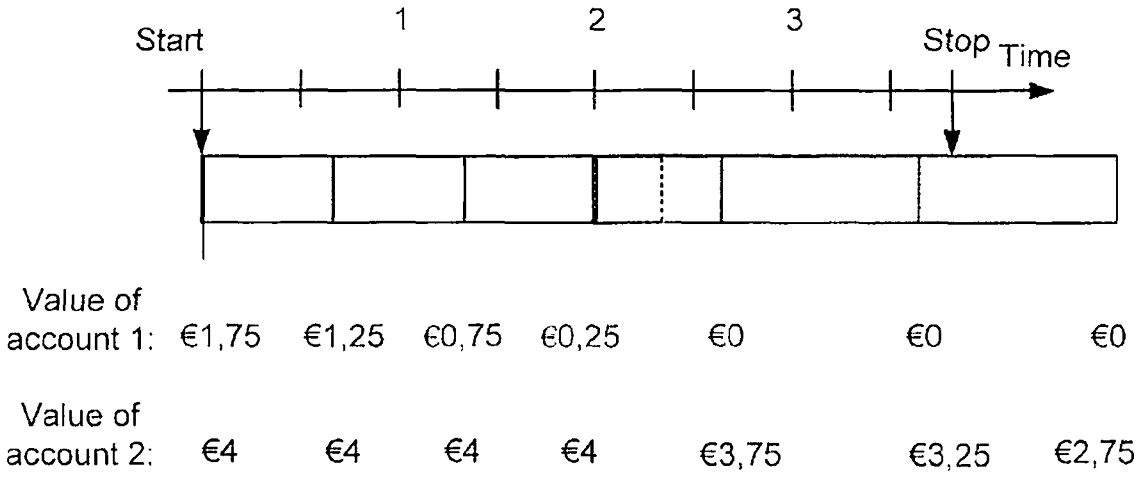
FIG. 3B illustrates an example embodiment of the second embodiment of the method of the invention.

An example embodiment of the second embodiment of the present invention is illustrated in FIG. 3B. A first account 1 is used for 3 charging intervals. When trying to fill the forth interval, the money on the first account only covers half of the interval. Funds from a second account 2 is used in order to complete the started charging interval. When the charging interval has been completed, the rate (cost and charging intervals) that applies when using the second account 2 is used.

A bonus is account sensitive. If the first account 1 in this example was a promotion and the second account 2 was the ordinary account, the bonus would normally only apply to the funds fetched from the second account 2. This is done to prevent bonus on bonus.

The invention makes it possible to emptying accounts in order to prevent unusable residue being stored and trigger account selections to reduce the number of access references to accounts that contains to little to be used for a more efficient system and signalling utilisation and also to prevent user annoyance.

The methods according to the invention are applicable to all charging, i.e both real-time with different reservation types and different deduct types, and non-real-time with only deducts or applied charges.

Although the invention has been described in conjunction with specific embodiments thereof this invention is susceptible of embodiments in different forms, with the understanding that the present disclosure is to be considered as an exemplification of the principles of the invention and is not intended to limit the invention to the specific embodiments illustrated. For example, the number of accounts can be an arbitrary number, usually several millions of main accounts with one or more associated sub-accounts. The disclosed embodiments of the method comprises a number of separate steps to be executed in a particular order. However, this particular number and order of the steps are not intended to limit the scope of the invention, but rather for the purpose of illustration. Various combinations, divisions and subdivisions of the method may be possible within the scope of the invention depending on the particular implementation.

Although the embodiments of the invention described with reference to the drawings comprise a computer apparatus and processes performed in the computer apparatus, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

The invention claimed is:

1. A method for operating a computer system to control service usage for a user in a communications network, wherein a particular amount of resources for service usage is represented by values in multiple accounts, comprising a charging rating of a session or event, selecting a first account from a set of accounts, to be used and rated with a charging interval of the first account;

calculating the cost of a first charging interval for the first account;

determining if the cost for the first charging interval is covered by a balance of the first account;

if the cost for the first charging interval is not covered, selecting a second account to be used from the set of accounts;

determining if the cost for a current charging interval minus residue units left on the first account is covered by the balance of at least the second account; and if so, continuing with the current charging interval, and using the residue units left on the first account before units of the selected second account are used, wherein the first account is emptied in order to prevent unusable residue to trigger account selections to reduce the number of access references to the first account.

2. The method according to claim 1, wherein the current charging interval is the charging interval of the first account.

3. The method according to claim 2, wherein the rate is the rate associated with the current charging interval.

4. The method according to claim 1, wherein the balance of at least the second account includes the balance of only the second account or the balance of the second account and one or more further accounts selected from the set of accounts.

5. The method according to claim 4, wherein the current charging interval is the charging interval of the second account or any of the one or more further accounts.

6. The method according to claim 1, wherein the step of determining if the cost for a next charging interval minus the residue units left on the first account is covered by at least the balance of the second account, comprises:

determining if the sum of charging intervals covers a requested amount of units; and if it is not covered, continuing with the next charging interval.

7. The apparatus according to claim 1, wherein the means for determining if the cost for a next charging interval minus the residue units left on the first account is covered by at least the balance of the second account, comprises:

means for determining if the sum of charging intervals covers a requested amount of units; and if it is not covered, means for continuing with the next charging interval.

8. An apparatus for controlling service usage for a user in a communications network, wherein a particular amount of resources for service usage is represented by values in multiple accounts, the apparatus including a processor, and one or more internal or external storage devices operatively connected to the processor, the apparatus comprising:

means for a charging rating of a session or event, selecting a first account from a set of accounts, to be used and rated with a charging interval of the first account;

means for calculating the cost of a first charging interval for the first account;

determining if the cost for the first charging interval is covered by a balance of the first account;

if the cost for the first charging interval is not covered, selecting a second account to be used from the set of accounts;

determining if the cost for a current charging interval minus residue units left on the first account is covered by the balance of at least the second account; and if so, continuing with the current charging interval, and using the residue units left on the first account before units of the selected second account are used, wherein the first account is emptied in order to prevent unusable residue to trigger account selections to reduce the number of access references to the first account.

9. The apparatus according to claim 8, wherein the current charging interval is the charging interval of the first account.

10. The apparatus according to claim 8, wherein the balance of at least the second account includes the balance of only the second account or the balance of the second account and one or more further accounts selected from the set of accounts.

11. The apparatus according to claim 10, wherein the current charging interval is the charging interval of the second account or any of the one or more further accounts.

12. The apparatus according to claim 9, wherein the rate is the rate associated with the current charging interval.

* * * * *